(12) United States Patent
Geiger et al.

(10) Patent No.: US 12,260,302 B2
(45) Date of Patent: Mar. 25, 2025

(54) METHOD AND APPARATUS FOR PERFORMING LEARNING FROM DEMONSTRATIONS, PARTICULARLY IMITATION LEARNING

(71) Applicant: Robert Bosch GmbH, Stuttgart (DE)

(72) Inventors: Philipp Geiger, Leonberg (DE); Seyed Jalal Etesami, Lausanne (CH)

(73) Assignee: ROBERT BOSCH GMBH, Stuttgart (DE)

( * ) Notice: Subject to any disclaimer, the term of this patent is extended or adjusted under 35 U.S.C. 154(b) by 1139 days.

(21) Appl. No.: 17/119,523

(22) Filed: Dec. 11, 2020

(65) Prior Publication Data

US 2021/0192391 A1 Jun. 24, 2021

(30) Foreign Application Priority Data

Dec. 20, 2019 (EP) ..................................... 19218664

(51) Int. Cl.
  *G06N 20/00* (2019.01)
  *G06F 16/901* (2019.01)
  *G06F 17/18* (2006.01)

(52) U.S. Cl.
  CPC ......... *G06N 20/00* (2019.01); *G06F 16/9024* (2019.01); *G06F 17/18* (2013.01)

(58) Field of Classification Search
  CPC ...... G06N 20/00; G06F 16/9024; G06F 17/18
  USPC ........................................................ 706/12
  See application file for complete search history.

(56) References Cited

U.S. PATENT DOCUMENTS

| | | | |
|---|---|---|---|
| 11,403,513 B2 * | 8/2022 | Hasenclever | G06N 3/084 |
| 2017/0024652 A1 * | 1/2017 | Kipersztok | G06N 7/01 |
| 2019/0236458 A1 * | 8/2019 | Taylor | G06F 17/17 |
| 2020/0104685 A1 * | 4/2020 | Hasenclever | G06N 3/084 |
| 2022/0187847 A1 * | 6/2022 | Cella | G06Q 10/06 |

OTHER PUBLICATIONS

Hua J, Zeng L, Li G, Ju Z. Learning for a Robot: Deep Reinforcement Learning, Imitation Learning, Transfer Learning. Sensors. 2021;21(4):1278, 21 pages. (Year: 2021).*
Felipe Leno Da Silva and Anna Helena Reali Costa. 2019. A survey on transfer learning for multiagent reinforcement learning systems. J. Artif. Int. Res. 64, 1 (Jan. 2019), 645-703. (Year: 2019).*
Matthew E. Taylor and Peter Stone. 2009. Transfer Learning for Reinforcement Learning Domains: A Survey. J. Mach. Learn. Res. 10 (Dec. 1, 2009), 1633-1685. (Year: 2009).*

(Continued)

*Primary Examiner* — James T Tsai
(74) *Attorney, Agent, or Firm* — NORTON ROSE FULBRIGHT US LLP; Gerard A. Messina

(57) ABSTRACT

A computer-implemented method for performing Learning from Demonstrations, particularly Imitation Learning, based on data associated with a first domain, particularly a source domain. The method includes: determining first data characterizing a demonstrator of the first domain, wherein particularly the first data characterizes sensor data of the demonstrator and/or sensor data of at least one spectator observing the demonstrator, determining first knowledge from the first domain based on the first data, transferring at least a part of the first knowledge to a second domain, particularly a target domain.

17 Claims, 5 Drawing Sheets

(56) References Cited

OTHER PUBLICATIONS

Jaquier, Noémie, Michael C. Welle, Andrej Gams, Kunpeng Yao, Bernardo Fichera, Aude Billard, Aleš Ude, Tamim Asfour and Danica Kragi'c. "Transfer Learning in Robotics: An Upcoming Breakthrough? A Review of Promises and Challenges." ArXiv abs/2311.18044 (2023): n. pp. 1-20. (Year: 2023).*
Brenna D. Argall, Sonia Chernova, Manuela Veloso, Brett Browning, A survey of robot learning from demonstration, Robotics and Autonomous Systems, vol. 57, Issue 5, 2009, pp. 469-483. (Year: 2009).*
Derui Ding, Zifan Ding, Guoliang Wei, Fei Han, An improved reinforcement learning algorithm based on knowledge transfer and applications in autonomous vehicles, Neurocomputing, vol. 361, 2019, pp. 243-255. (Year: 2019).*
Barrett, Samuel, Matthew E. Taylor and Peter Stone. "Transfer learning for reinforcement learning on a physical robot." Adaptive Agents and Multi-Agent Systems (2010). (Year: 2010).*
Plisnier et al.,"Transfer Learning Across Simulated Robots With Different Sensors," Jul. 18, 2019, ArXiv, 6 pages. (Year: 2019).*
Bansal, Mayank & Krizhevsky, Alex & Ogale, Abhijit. (2019). ChauffeurNet: Learning to Drive by Imitating the Best and Synthesizing the Worst, pp. 1-20. (Year: 2019).*
Geiger, P. et al.,"Experimental and Causal View on Information Integration in Autonomous Agents," Mar. 13, 2018, arXiv, 8 pages. (Year: 2018).*
Etesami, Jalal & Geiger, Philipp. (2020). Causal Transfer for Imitation Learning and Decision Making under Sensor-Shift. Proceedings of the AAAI Conference on Artificial Intelligence. 34. 10118-10125. (Year: 2020).*
Ghassami A, Kiyavash N, Huang B, Zhang K. Multi-domain Causal Structure Learning in Linear Systems. Adv Neural Inf Process Syst. Dec. 2018;31:6266-6276. PMID: 30971863. (Year: 2018).*
Lorincz, Z.,"Overview of Imitation Learning," Sep. 19, 2019, SmartLab AI, medium.com, 20 pages. (Year: 2019).*
Zhang, J. et al.,"Transfer Learning in Multi-Armed Bandits: A Causal Approach," Proc. 26th Intl. Conf. on AI (IJCAI—17), 2017, pp. 1340-1346. (Year: 2017).*
Zeng, Y. et al.,"A Survey of Causal Reinforcement Learning," Jun. 1, 2023, arXiv, 29 pages. (Year: 2023).*
Christopher G. Atkeson and Stefan Schaal. 1997. Robot Learning From Demonstration. In Proceedings of the Fourteenth International Conference on Machine Learning (ICML '97). Morgan Kaufmann Publishers Inc., San Francisco, CA, USA, 12-20. (Year: 1997).*
Ruan, Kangrui and Xuan Di. "Learning Human Driving Behaviors with Sequential Causal Imitation Learning." AAAI Conference on Artificial Intelligence (2022). (Year: 2022).*
Taylor, Matthew E., and Janusz Kacprzyk. Transfer in reinforcement learning domains. vol. 216. Berlin/Heidelberg, Germany: Springer, 2009. (Year: 2009).*
Bianchi et al.,"Transferring Knowledge as Heuristics in Reinforcement Learing: A Case-Based Approach," Artificial Intelligence 226 (2015) 102-121. (Year: 2015).*
Michini, B. et al.,"Scaable Reward Learning from Demonstration," 2013 IEEE, Interational Conf. on Robotics & Automation (ICRA), pp. 303-308. (Year: 2013).*
Pan et al., "A Survey on Transfer Learning," IEEE Transactions on Knowledge & Data Engineering, vol. 22, No. 10, Oct. 2010, pp. 1345-1359. (Year: 2010).*
M. Long, J. Wang, G. Ding, J. Sun and P. S. Yu, "Transfer Feature Learning with Joint Distribution Adaptation," 2013 IEEE International Conference on Computer Vision, Sydney, NSW, Australia, 2013, pp. 2200-2207 (Year: 2013).*
De Haan, et al.: "Causal Confusion in Imitation Learning", 33 Conf. onn Neural Information Processing Systems (NeurIPS 2019), Vancouver, Canada, arxiv.org, Cornell University Library, (2019), pp. 1-17, XP081526691.
Geiger, et al.: "Experimental and causal view on information integration in autonomous agents", arxiv.org, Cornell University Library, (2018), pp. 1-8, XP081353082.
Zhang and Bareinboim: "Transfer Learning in Multi-Armed Bandit: A Causal Approach", (Extended abstract), Proceedings of The 16th International Joint Conference on Autonomous Agents and Multiagent Systems, AAMAS 2017, International Foundation for Autonomous Agents, vol. 3, (2017), pp. 1778-1780, XP002799427.

\* cited by examiner

METHOD AND APPARATUS FOR PERFORMING LEARNING FROM DEMONSTRATIONS, PARTICULARLY IMITATION LEARNING

CROSS REFERENCE

The present application claims the benefit under 35 U.S.C. § 119 of European Patent Application No. EP 19218664.1 filed on Dec. 20, 2019, which is expressly incorporated herein by reference in its entirety.

FIELD

Exemplary embodiments of the present invention relate to a method for performing Learning from Demonstrations, LfD, particularly Imitation Learning, IL, based on data associated with a first domain.

Further exemplary embodiments of the present invention relate to an apparatus for performing Learning from Demonstrations, particularly Imitation Learning, based on data associated with a first domain.

SUMMARY

Exemplary preferred embodiments of the present invention relate to a method, preferably a computer-implemented method, for performing Learning from Demonstrations, LfD, particularly Imitation Learning, based on data associated with a first domain, particularly a source domain, said method comprising: determining first data characterizing a demonstrator (particularly a behavior such as e.g. a movement of said demonstrator) of said first domain, wherein particularly said first data characterizes sensor data of said demonstrator and/or sensor data of at least one spectator observing said demonstrator, determining first knowledge from said first domain based on said first data, transferring at least a part of said first knowledge to a second domain, particularly a target domain. This enables to employ said at least part of said first knowledge in a second domain.

According to further preferred embodiments of the present invention, this approach may, e.g., be used in the field of "Learning from Demonstrations" (LfD), e.g., to address at least one of the tasks: (1) inferring an effect of a selected action on outcome given observation, and (2) imitation learning.

According to further preferred embodiments, major issues in Learning from Demonstration may arise when the sensors that record the demonstrator (or known as experts) differ from those available to an (artificial intelligence, AI) agent that is to be trained. For instance, according to further preferred embodiments, e.g., for the development of self-driving cars, drones may be deployed to fly over highways to record comparatively large amounts of demonstrations by human-driven cars. According to inventors' analysis, in such drone recordings, some crucial variables for applying LfD techniques may either completely be missing, e.g., indicator lights of the observed cars, or they may be more noisy than a human or sensor can observe from within a car, in contrast to the perspective of the drone(s).

Further, according to inventors' analysis, ignoring such issues, or addressing them in a naive way, may result in significantly wrong conclusions about demonstrator's behavior and the demonstrator's actions' effects on the environment. As a simple example according to further embodiments, assume one wants to use highway drone data, to learn how an acceleration action A of a "demonstrator car" affects a lane changing behavior Z of a "lead car" in front of it on a slower (e.g., right) lane.

According to further preferred embodiments of the present invention, slightly simplifying the reality, assume the indicator light of the lead car serves as a perfect coordination device: whenever it is on, it will result in (1) the demonstrator car decelerating and (2) the lead car changing lane to the fast lane. Now assume one just uses the variables recorded in the drone data of said drone(s), where the indicator light is not contained, estimate P(Z|A) (probability of changing lane given the acceleration) from it. This may lead to the conclusion that an agent in the place of the demonstrator can arbitrarily choose any acceleration or deceleration action, and the lead car will perfectly adapt Z and only change lane when agent decelerates—which in practice can lead to crashes.

To at least partly mitigate these disadvantages, the principle according to the example embodiments is proposed. According to further preferred embodiments of the present invention, said steps of determining first data characterizing said demonstrator of said first domain (i.e., characterizing a behavior such as, e.g., a movement of said demonstrator), determining first knowledge from said first domain based on said first data, transferring at least a part of said first knowledge to a second domain enable learning from demonstrations (LfD) under sensor-shift, i.e., when a) the sensors of the demonstrator, and/or b) the sensors that are used to observe the demonstrator, and/or c) the sensors of an AI agent that is to be trained depending on said demonstrator are different.

According to further preferred embodiments of the present invention, said first data may comprise sensor data of said demonstrator and/or of at least one observer configured to at least temporarily observe said demonstrator, and/or data derived from said sensor data of said demonstrator and/or of at least one observer configured to at least temporarily observe said demonstrator.

According to further preferred embodiments of the present invention, sensor characteristics of a spectator in the first, i.e., source, domain, and/or sensor characteristics of a target agent in the second, i.e., target, domain, i.e., $P\_S(Y\_S|X)$ and $P\_T(Y\_T|X)$ may (preferably additionally) be used.

According to further preferred embodiments of the present invention, which are explained in detail further below, methods and techniques are provided that enable to use causal models to, preferably rigorously, analyze, particularly on a population-level, to what extent the relevant underlying mechanisms (the decision-effect and the demonstrator policy) can be identified and transferred from the available observations. Furthermore, further preferred embodiments of the present invention provide algorithms to determine, particularly calculate, them.

According to further preferred embodiments of the present invention, proxy methods are introduced which may—at least in some cases—be easier to calculate, and/or to estimate from finite data and/or to interpret than the exact solutions, alongside theoretical bounds on their closeness to the exact ones.

According to further preferred embodiments of the present invention, the first domain may also be denoted as "source domain", wherein said demonstrator (e.g., demonstrator car according to the abovementioned example) acts.

According to further preferred embodiments of the present invention, the second domain may also be denoted as "target domain", wherein a target agent (referred to as "AI agent" in the abovementioned example) observes (e.g., to perform LfD and/or to be trained using LfD) and acts.

According to further preferred embodiments of the present invention, the term "domain" may denote a, preferably complete, causal structure of environment and/or sensors and/or the respective agent(s).

Further preferred embodiments of the present invention further comprise: modeling the first (e.g., source) domain by means of a, preferably causal, directed acyclic graph, DAG, and/or modeling the second (e.g., target) domain by means of a, preferably causal, directed acyclic graph.

According to further preferred embodiments of the present invention, the following variables may be used, e.g. within said DAGs: variable "X" may characterize a state of the system, variable "A" may characterize an action of an agent, and variable "Z" may characterize (i.e., stand for) an outcome (e.g., an abstract variable that could e.g. be, say, the state of cars in a the next time instance given a state and an action).

According to further preferred embodiments of the present invention, the following variables may be used, especially to characterize observations: the variable "$Y_D$" may characterize the demonstrator's input, e.g., generated by the demonstrator's sensor(s), the variable "$Y_S$" may characterize the AI agent's observation of the state of the source system (e.g., drone data from the high-way, in the context of the aforementioned example), and in the target domain, the variable "$Y_T$" may characterize an input to the target agent measured by its sensors.

According to further preferred embodiments of the present invention, let the distributions over variables in the source domain and the target domain (e.g. P(Z)) be denoted by subscript "S" and "T", respectively (e.g., $P_S(Z)$ and $P_T(Z)$). According to further preferred embodiments, let $\pi_D(a|Y_D)$ denote a policy of the demonstrator (also denoted as "expert"), and $\sigma_T(a|Y_T)$ denote a policy of the target agent.

Further preferred embodiments of the present invention relate to a method of designing a target agent that observes and successfully acts in the target domain, e.g., based on what is known and/or what may be derived from the source domain (e.g., from observing the demonstrator) and its relation to the target domain.

According to further preferred embodiments of the present invention, said method further comprises: determining, particularly inferring, an effect of an action to an outcome in the second domain, particularly conditional on an observation in said second domain.

According to further preferred embodiments of the present invention, said method further comprises: providing a utility function u(Z) associated with said outcome, and, optionally, determining a first action by maximizing said utility function u with respect to an action a, particularly based on said observation, wherein said optional step of determining may, e.g., be performed based on the equation E[u(Z)|do(a), $Y_T$], wherein E[ ] is an expected value.

According to further preferred embodiments of the present invention, said method further comprises: determining, particularly inferring, a conditional distribution over actions a given an or said observation in the second domain, preferably such that a target agent associated with said second domain behaves similar to a or said demonstrator of the first domain.

According to further preferred embodiments of the present invention, said method further comprises: a) using, particularly characterizing one or more aspects of at least one of said DAGs with, the equation, $$p_S(z, a, y_S) = \sum_x p_S(y_S|x) p_S(z, a, x) = \sum_{x, y_D} p_S(y_S|x) p(z|a, x) \pi_D(a|y_D) p_S(y_D, x).$$

and/or b) using, particularly characterizing one or more aspects of at least one of said DAGs with, the equation $$\begin{bmatrix} P(z, a, y^1) \\ \vdots \\ P(z, a, y^m) \end{bmatrix} = \begin{bmatrix} P(y^1|x^1) & \cdots & P(y^1|x^\ell) \\ \vdots & & \vdots \\ P(y^m|x^1) & \cdots & P(y^m|x^\ell) \end{bmatrix} \begin{bmatrix} P(z, a, x^1) \\ \vdots \\ P(z, a, x^\ell) \end{bmatrix} \quad \text{[equation 1]}$$

(this is a matrix form of the preceding equation according to further preferred embodiments, where all variables are discrete), preferably for all values of z and/or all values of a.

In the above equation $P_S(z, a, y_S)$ denotes a joint distribution of outcome, action, and the observation in the source domain, $P_S(y_S|x)$ is a conditional distribution of the observation in the source domain given the state, and $P_S(z, a, x)$ is a joint distribution of outcome, action, and state, respectively. P(z|a, x) is a conditional distribution of the outcome given action and state.

According to further preferred embodiments of the present invention, said method further comprises: using, particularly for said step of determining, the equation $$\tilde{p}(Z|X=x, A) := \sum_y p_S(Z|Y_S=y, A) p(Y_S=y|s), \quad \text{[equation 2]}$$

wherein $\tilde{p}(Z|X=x, A)$ characterizes a proxy for the conditional distribution of outcome given action and state (particularly an average-based action-effect proxy), wherein $p_S(Z|Y_S=y, A)$ characterizes a conditional distribution of the outcome given the action and the observation in the source domain, and wherein $p(Y_S=y|x)$ characterizes a conditional distribution of the observation in the source domain given the state.

According to further preferred embodiments of the present invention, the [equation 2] characterizes or represents an average-based decision-effect proxy of p(z|X, A), defined, preferably only, based on known aspects, i.e., from the source domain. According to further preferred embodiments of the present invention, a deviation between the average-based proxy ([equation 2]) and the ground truth that it approximates can be bounded in the following way: $D(P_S(Z|X, A) \| \tilde{P}(Z|X, A) \leq I_S(X:Z|A, Y_S)$. In this inequality, $D(\bullet\|\bullet)$ denotes the Kullback-Leibler (KL) divergence and $I_S(X:Z|A, Y_S)$ is a conditional mutual information between the state and the outcome given the action and the observation in the source domain.

According to further preferred embodiments of the present invention, said method further comprises: using at least one of the following equations, particularly for said step of determining, particularly inferring, said conditional distribution over actions a: a)

$$\tilde{\pi}_T^{(1)}(a \mid Y_T = y) = \oint_{y'} p_S(a \mid Y_S = y') p_S(Y_S = y' \mid Y_D = y) \quad \text{[equation 3a], b)}$$

$$\tilde{\pi}_T^{(2)}(a \mid y_T) \propto \exp\left(\oint_{y_S} p(y_S \mid y_T) \log p_S(a \mid y_S)\right) \quad \text{[equation 3b], c)}$$

$$\tilde{\pi}_T^{(3)}(a \mid y_T) \propto \exp\left(\oint_x p(x \mid y_T) \log \tilde{p}(a \mid x)\right) \quad \text{[equation 3c]}$$

According to further preferred embodiments of the present invention, when using [equation 3a], a deviation from its true distribution is bounded by the following result:
$D(\pi_D \| \tilde{\pi}_T^{(1)}) \leq I_S(A; Y_D | Y_S)$.

According to further preferred embodiments, when using [equation 3c], the expression $\tilde{p}(a|x)$ is defined by $$\tilde{p}(a \mid x) := \oint_y p_S(a \mid Y_S = y) p_S(Y_S = y \mid x)$$

According to further preferred embodiments, said method further comprises: a) using, if a or said observation in said second domain is the same as an expert's observation (i.e., $Y_T = Y_D$), the equation $$\tilde{\pi}_T^{(1)}(a \mid Y_T = y) = \oint_{y'} p_S(a \mid Y_S = y') p_S(Y_S = y' \mid Y_D = y),$$

and/or b) using, if demonstrator's sensors and a target agent's sensors in the first domain are the same, but if the target agent's sensors in the first domain are different from the target agent's sensors in the second domain (i.e., $Y_T \neq Y_D = Y_S$), the equation $$\tilde{\pi}_T^{(2)}(a \mid y_T) \propto \exp\left(\oint_{y_S} p(y_S \mid y_T) \log p_S(a \mid y_S)\right)$$

and/or c) using, if the demonstrator's sensors and the target agent's sensors in the first domain and the target agent's sensors in the second domain are each different from each other (i.e., $Y_T \neq Y_D \neq Y_S$), the equation $$\tilde{\pi}_T^{(3)}(a \mid y_T) \propto \exp\left(\oint_x p(x \mid y_T) \log \tilde{p}(a \mid x)\right),$$

wherein $\tilde{p}(a \mid x) := \oint_y p_S(a \mid Y_S = y) p_S(Y_S = y \mid x)$.

According to further embodiments of the present invention, in the above equations, variables with tilde ("~") represent the proxies. According to further embodiments, $P(y_S | y_T)$ denotes a conditional distribution of the observation in the source domain given the observation in the target domain. The other variables are explained above.

Further preferred embodiments of the present relate to an apparatus configured to perform the example method(s) described above.

Further preferred embodiments of the present invention relate to a computer program comprising instructions which, when the program is executed by a computer, cause the computer to carry out the method(s) according to the embodiments.

Further preferred embodiments of the present invention relate to a computer-readable storage medium comprising instructions which, when executed by a computer, cause the computer to carry out the method according to the example embodiments.

Further preferred embodiments relate to a data carrier signal carrying the computer program according to the example embodiments.

Further preferred embodiments relate to a use of the method according to the embodiments and/or of the apparatus according to the embodiments and/or of the computer program according to the embodiments for at least one of: a) training a machine learning system, b) determining and/or providing training data, particularly for a machine learning system, c) learning from demonstrations, particularly under sensor-shift, i.e., when the sensors of the demonstrator and/or the sensors that are used to observe the demonstrator, and/or the sensors of the AI agent that is to be trained (or respective data as can be obtained from these sensors, respectively) are different.

According to further preferred embodiments of the present invention, the principle according to the embodiments can be used to receive sensor signals (e.g., of the demonstrator and/or of at least one spectator or observer observing said demonstrator), e.g., from at least one sensor such as, e.g., video, radar, LiDAR, ultrasonic, motion, and the like, to name a few, wherein, e.g., at least parts of said sensor signals may be processed as said data associated with the first domain according to preferred embodiments.

According to further preferred embodiments of the present invention, the principle according to the embodiments can be used to compute one or more control signals for controlling a physical system, like e.g. a computer-controlled machine, like a robot, a vehicle, a manufacturing machine, a personal assistant or an access control system or the like, and/or for providing a control signal for controlling said physical system, particularly a technical system, particularly a vehicle.

Further preferred embodiments of the present invention may comprise at least one of the following steps: a) analyzing and/or processing the sensor data, b) incorporating specifications of sensors in both the source domain (first domain) and the target (second) domain(s), c) transfer extracted knowledge from the source domain to the target domain.

According to further preferred embodiments of the present invention, the principle according to the embodiments can be used to train a machine learning system that can be used for, e.g., the above applications. According to further preferred embodiments, such machine learning system may e.g. be provided using the apparatus according to the embodiments.

According to further preferred embodiments of the present invention, the principle according to the embodiments can be used to generate training data for training a machine learning system that can, e.g., be used for the above applications.

BRIEF DESCRIPTION OF THE DRAWINGS

Some exemplary embodiments will now be described with reference to the accompanying figures.

DETAILED DESCRIPTION OF EXAMPLE EMBODIMENTS

Figure 1:
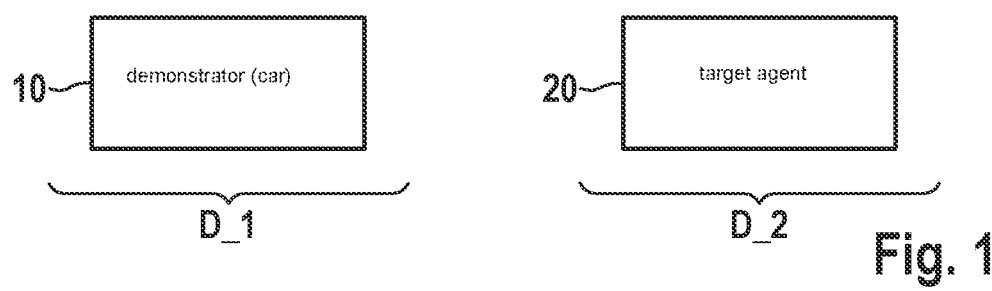
FIG. 1 schematically depicts a simplified block diagram according to preferred embodiments of the present invention.

FIG. 1 schematically depicts a simplified block diagram according to preferred embodiments. Depicted is a first domain D_1 and a second domain D_2. According to further preferred embodiments, the first domain D_1 may also be denoted as "source domain", wherein a demonstrator 10, e.g., a demonstrator car 10 as exemplarily depicted by FIG. 6, acts.

According to further preferred embodiments, the second domain D_2 may also be denoted as "target domain", wherein a target agent 20 (or "AI agent") may observe (e.g., to perform LfD) and act.

According to further preferred embodiments, the term "domain" may denote a, preferably complete, causal structure of environment, sensors, and the respective agent(s). Hence, according to further preferred embodiments, the first domain D_1 and/or the second domain D_2 of FIG. 1 may represent a, preferably complete, causal structure of environment, sensors, and the respective agent(s) 10, 20.

Figure 2A:
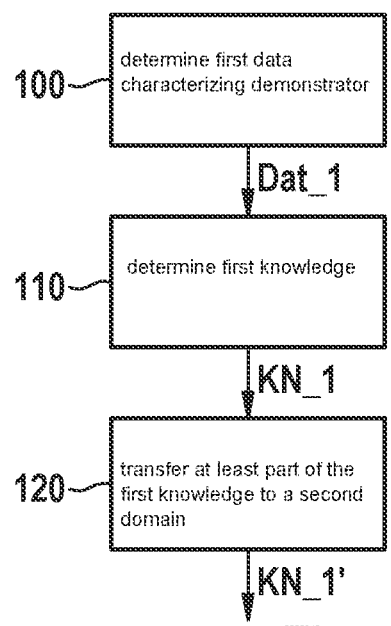
FIG. 2A schematically depicts a simplified flow chart of a method according to further preferred embodiments of the present invention.

Exemplary preferred embodiments, cf. FIG. 2A, relate to a method, preferably a computer-implemented method, of processing data associated with a first domain D_1 (FIG. 1), particularly for performing Learning from Demonstrations, LfD, particularly Imitation Learning, based on said data associated with said first domain, particularly a source domain, said method comprising: determining 100 (FIG. 2A) first data Dat_1 characterizing a demonstrator 10 of said first domain D_1, wherein particularly said first data Dat_1 characterizes sensor data of said demonstrator 10 and/or sensor data of at least one spectator ("observer") observing said demonstrator 10, determining 110 first knowledge KN_1 from said first domain D_1 based on said first data Dat_1, transferring 120 at least a part KN_1' of said first knowledge KN_1 to a second domain D_2, which e.g. is a target domain. This enables to employ said at least part KN_1' of said first knowledge KN_1 to a second domain D_2, which is e.g. associated with an agent to be trained, e.g. by using an LfD or IL technique.

According to further preferred embodiments, the approach exemplarily depicted by FIG. 1, 2A may e.g. be used in the field of "Learning from Demonstrations" (LfD), e.g. to address at least one of the tasks: (1) inferring an effect of a selected action on outcome given observation, and (2) imitation learning.

According to further preferred embodiments, major issues in LfD may arise when the sensors that record the demonstrator ("expert") 10 (FIG. 1) differ from those available to an (artificial intelligence, AI) agent 20 that is to be trained. For instance, according to further preferred embodiments, e.g. for the development of self-driving cars, drones DR (FIG. 6) may be deployed to fly over highways HW to record comparatively large amounts of demonstrations, e.g. provided by human-driven cars 2. According to inventors' analysis, in such drone recordings, some crucial variables for applying LfD techniques may either completely be missing, e.g., indicator lights IL of the observed cars 2, or they may be more noisy than a human or sensor can observe from within a car, in contrast to the perspective of the drone(s) DR.

Further, according to inventors' analysis, ignoring such issues, or addressing them in a naive way, may result in significantly wrong conclusions about demonstrator's behavior and the demonstrator's actions' effects on the environment. As a simple example according to further embodiments, assume one wants to use highway drone data, e.g. of the drone DR of FIG. 6, to learn how an acceleration action A of a "demonstrator car" 10 affects a lane changing behavior Z of a "lead car" 2 in front of it on a slower (e.g. right) lane L1.

According to further preferred embodiments, slightly simplifying the reality, assume the indicator light IL of the lead car 2 serves as a perfect coordination device: whenever it is on, it will result in (1) the demonstrator car 10 decelerating and (2) the lead car 2 changing lane to the fast lane L2. Now assume one just uses the variables recorded in the drone data of said drone(s) DR, where the indicator light IL is not contained, estimate P(Z|A) (probability of changing lane given the acceleration) from it. This may lead to the conclusion that an agent in the place of the demonstrator 10 can arbitrarily chose any acceleration or deceleration action, and the lead car 2 will perfectly adapt Z and only change lane when agent decelerates—which in practice can lead to crashes.

To at least partly mitigate these disadvantages, the principle according to the embodiments is proposed, as exemplarily depicted inter alia by FIG. 2A already discussed above. According to further preferred embodiments, said steps of determining 100 first data Dat_1 associated with a demonstrator 10 (FIG. 1, 6) of said first domain D_1, determining 110 first knowledge KN_1 from said first domain D_1 based on said first data Dat_1, transferring 120 at least a part KN_1' of said first knowledge KN_1 to a second domain D_2 enable learning from demonstrations (LfD) under sensor-shift, i.e., when a) the sensors of the demonstrator 10 and/or b) the sensors that are used to observe the demonstrator 10, and/or c) the sensors of an AI agent that is to be trained depending on said demonstrator 10 are different.

According to further preferred embodiments, which are explained in detail further below, methods and techniques are proposed that enable to use causal models to, preferably rigorously, analyze, on a population-level, to what extent the relevant underlying mechanisms (the decision-effect and the demonstrator policy) can be identified and transferred from the available observations. Furthermore, further preferred embodiments propose algorithms to calculate them.

According to further preferred embodiments, proxy methods are introduced which may be easier to calculate, and/or to estimate from finite data and/or to interpret than the exact solutions, alongside theoretical bounds on their closeness to the exact ones.

Figure 2C:
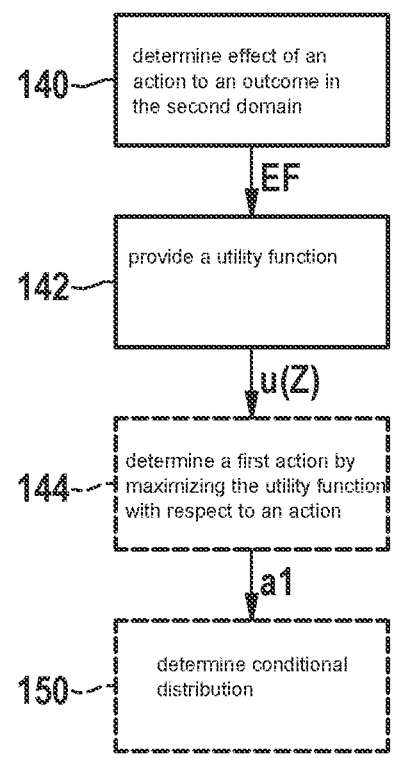
FIG. 2C schematically depicts a simplified flow chart of a method according to further preferred embodiments of the present invention.
Figure 2B:
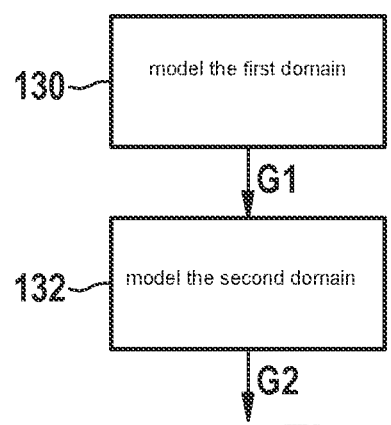
FIG. 2B schematically depicts a simplified flow chart of a method according to further preferred embodiments of the present invention.

Further preferred embodiments further comprise, cf. FIG. 2B: modeling 130 the first (e.g., source) domain D_1 (FIG. 1) by means of a directed acyclic graph, DAG, G1 and/or modeling 132 the second (e.g., target) domain D_2 by means of a DAG G2. In this regard, FIG. 3 schematically depicts the first DAG G1 that models and/or characterizes said first domain D_1 and said second DAG G2 that models and/or characterizes said second domain D_2.

Figure 3:
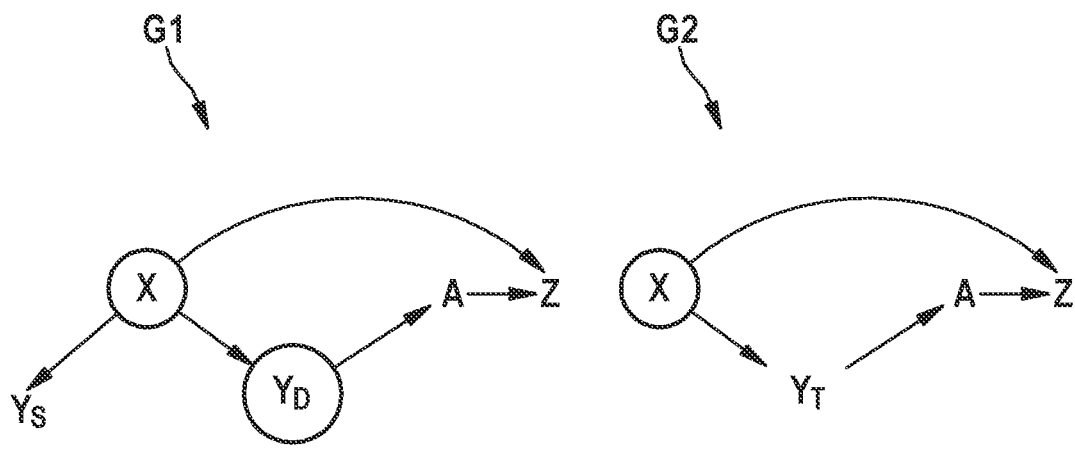
FIG. 3 schematically depicts two graphs according to further preferred embodiments of the present invention.

According to further preferred embodiments, the following variables may be used, e.g. within said DAGs G1, G2, cf. FIG. 3: variable "X" may characterize a state of the system, variable "A" may characterize an action of an agent, and variable "Z" may characterize (i.e., stand for) an outcome (e.g., an abstract variable that could e.g. be, say, the state of cars in a the next time instance given a state and an action).

Figure 6:
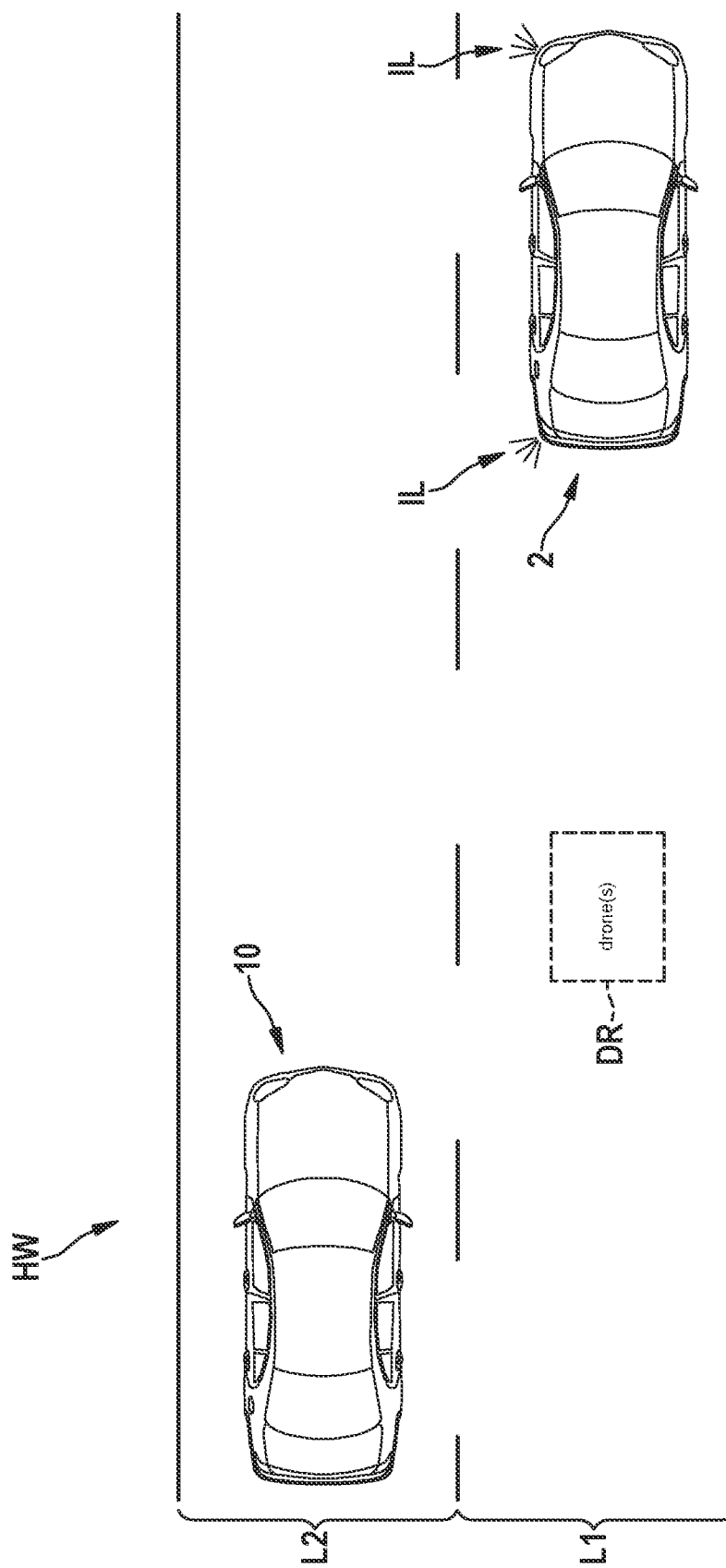
FIG. 6 schematically depicts a scenario according to further preferred embodiments of the present invention.

According to further preferred embodiments, the following variables may be used, especially to characterize observations: the variable "$Y_D$" may characterize the demonstrator's input, e.g. generated by the demonstrator's sensor(s), the variable "$Y_S$" may characterize the AI agent's observation of the state of the source system (e.g., drone data from the high-way HW, in the context of the aforementioned example of FIG. 6), and in the target domain, the variable "$Y_T$" may characterize an input to the target agent measured by its sensors.

According to further preferred embodiments, let the distributions over variables in the source domain and the target domain (e.g. P(Z)) be denoted by subscript "S" and "T", respectively (e.g., $P_S(Z)$ and $P_T(Z)$). According to further preferred embodiments, let $\pi_D(a|Y_D)$ denote a policy of the demonstrator 10 (also denoted as "expert"), and $\pi_T(a|Y_T)$ denote a policy of the target agent.

Further preferred embodiments relate to a method of designing a target agent that observes and successfully acts in the target domain D_2 (FIG. 1), e.g., based on what is known and/or what may be derived from the source domain D_1 (e.g., from observing the demonstrator 10) and its relation to the target domain.

According to further preferred embodiments, said method further comprises, cf. FIG. 2C: determining 140, particularly inferring, an effect EF of an action to an outcome in the second domain D_2, particularly conditional on an observation $Y_T$ in said second domain D_2.

According to further preferred embodiments, said method further comprises: providing 142 a utility function u(Z) associated with said outcome, and, optionally, determining 144 a first action a1 by maximizing said utility function u(Z) with respect to an action a, particularly based on said observation $Y_T$, wherein said optional step of determining 144 may e.g. be performed based on the equation E[u(Z)|do(a), $Y_T$], wherein E[ ] is an expected value.

According to further preferred embodiments, said method further comprises, cf. FIG. 2C: determining 150, particularly inferring, a conditional distribution over actions a given an or said observation $Y_T$ in the second domain D_2, preferably such that a target agent 20 (FIG. 1) associated with said second domain D_2 behaves similar to a or said demonstrator 10 (FIG. 1) of the first domain.

Figure 7A:
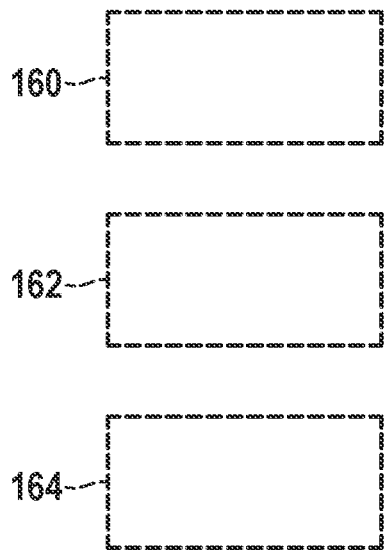
FIG. 7A schematically depicts a simplified flow chart of a method according to further preferred embodiments of the present invention.

According to further preferred embodiments, cf. FIG. 7A, said method further comprises: a) using 160 the equation $$p_S(z, a, y_S) =$$
$$\oint p_S(y_S \mid x) p_S(z, a, x) = \oint_{x, y_D} p_S(y_S \mid x) p(z \mid a, x) \pi_D(a \mid y_D) p_S(y_D, x),$$

particularly characterizing one or more aspects of at least one of said DAGs G1, G2 (FIG. 3) with the equation $$p_S(z, a, y_S) =$$
$$\oint p_S(y_S \mid x) p_S(z, a, x) = \oint_{x, y_D} p_S(y_S \mid x) p(z \mid a, x) \pi_D(a \mid y_D) p_S(y_D, x),$$

and/or b) using 160, particularly characterizing one or more aspects of at least one of said DAGs with, the equation $$\begin{bmatrix} P(z, a, y^1) \\ \vdots \\ P(z, a, y^m) \end{bmatrix} = \begin{bmatrix} P(y^1 \mid x^1) & \cdots & P(y^1 \mid x^\ell) \\ \vdots & & \vdots \\ P(y^m \mid x^1) & \cdots & P(y^m \mid x^\ell) \end{bmatrix} \begin{bmatrix} P(z, a, x^1) \\ \vdots \\ P(z, a, x^\ell) \end{bmatrix}, \quad \text{[equation 1]}$$

preferably for all values of z and/or all values of a.

According to further preferred embodiments, said method further comprises: using 162, particularly for said step of determining 140 (FIG. 2C), the equation $$\tilde{p}(Z \mid X = x, A) := \sum_y p_S(Z \mid Y_S = y, A) p(Y_S = y \mid x),$$

wherein $\tilde{p}(Z|X=x, A)$ characterizes a proxy for the conditional distribution of outcome given action and state (average-based action-effect proxy), wherein $p_S(Z|Y_S=y, A)$ characterizes a conditional distribution of the outcome given the action and the observation in the source domain D_1, and wherein $p(Y_S=y|x)$ characterizes a conditional distribution of the observation in the source domain D_1 given the state.

According to further preferred embodiments, said method further comprises: using 164 (FIG. 7A) at least one of the following equations, particularly for said step of determining 150 (FIG. 2C), particularly inferring, said conditional distribution over actions a: a)

$$\tilde{\pi}_T^{(1)}(a \mid Y_T = y) = \oint_{y'} p_S(a \mid Y_S = y') p_S(Y_S = y' \mid Y_D = y), b)$$

$$\tilde{\pi}_T^{(2)}(a \mid y_T) \propto \exp\left(\oint_{y_S} p(y_S \mid y_T) \log p_S(a \mid y_S)\right), c)$$

$$\tilde{\pi}_T^{(3)}(a \mid y_T) \propto \exp\left(\oint_x p(x \mid y_T) \log \tilde{p}(a \mid x)\right).$$

Figure 4:
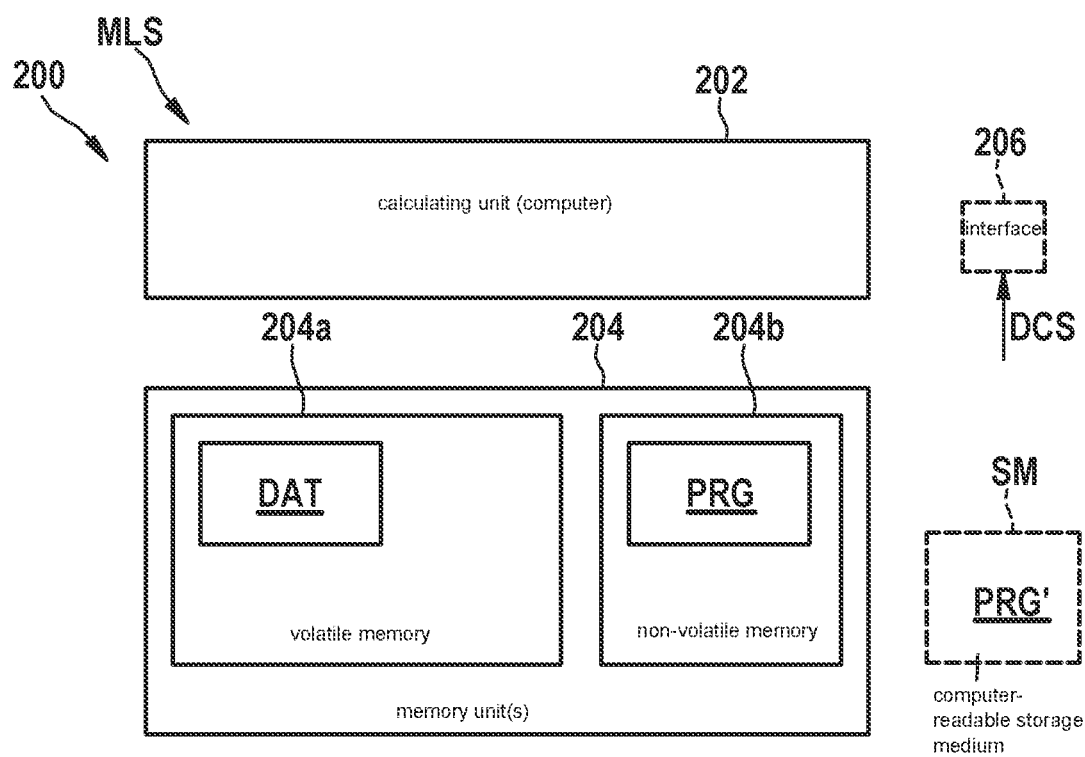
FIG. 4 schematically depicts a simplified block diagram of an apparatus according to further preferred embodiments of the present invention.
Figure 7B:
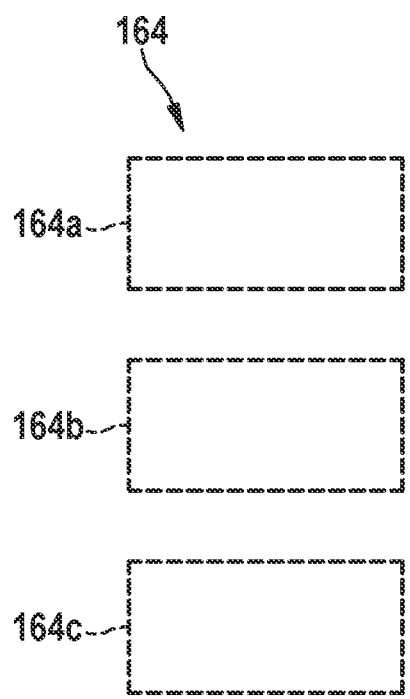
FIG. 7B schematically depicts a simplified flow chart of a method according to further preferred embodiments of the present invention.

According to further preferred embodiments, said step of using 164 further comprises, cf. FIG. 7B: a) using 164a, if a or said observation in said second domain D_2 is the same as an expert's observation, the equation $$\hat{\pi}_T^{(1)}(a \mid Y_T = y) = \sum_{y'} p_S(a \mid Y_S = y') p_S(Y_S = y' \mid Y_D = y),$$

and/or b) using 164b, if demonstrator's sensors and a target agent's sensors in the first domain D_1 are the same, but if the target agent's sensors in the first domain D_1 are different from the target agent's sensors in the second domain D_2, the equation $$\hat{\pi}_T^{(2)}(a \mid y_T) \propto \exp\left(\sum_{y_S} p(y_S \mid y_T) \log p_S(a \mid y_S)\right)$$

and/or c) using 164c, if the demonstrator's sensors and the target agent's sensors in the first domain D_1 and the target agent's sensors in the second domain D_2 are each different from each other, the equation $$\hat{\pi}_T^{(3)}(a \mid y_T) \propto \exp\left(\sum_x p(x \mid y_T) \log \tilde{p}(a \mid x)\right),$$

wherein $\tilde{p}(a \mid x) := \sum_y p_S(a \mid Y_S = y) p_S(Y_S = y \mid x).$ Further preferred embodiments relate to an apparatus 200, cf. FIG. 4, configured to perform the method according to the embodiments. The apparatus 200 comprises at least one calculating unit 202 ("computer") and at least one memory unit 204 associated with (i.e., usably by) said at least one calculating unit 202 for at least temporarily storing a computer program PRG and/or data DAT, wherein said computer program PRG is, e.g., configured to at least temporarily control an operation of said apparatus 200, e.g. the execution of a method according to the embodiments, for example for performing an LfD-technique based on e.g. the method according to FIG. 2A.

According to further preferred embodiments, said at least one calculating unit 202 is configured to execute said computer program PRG or at least parts thereof, e.g. for executing the method according to the embodiments or at least one or more steps thereof.

According to further preferred embodiments, said at least one calculating unit 202 may comprise at least one of the following elements: a microprocessor, a microcontroller, a digital signal processor (DSP), a programmable logic element (e.g., FPGA, field programmable gate array), an ASIC (application specific integrated circuit), hardware circuitry, a graphics processor (GPU), a tensor processor. According to further preferred embodiments, any combination of two or more of these elements is also possible.

According to further preferred embodiments, the memory unit 204 comprises at least one of the following elements: a volatile memory 204a, particularly a random-access memory (RAM), a non-volatile memory 204b, particularly a Flash-EEPROM. Preferably, said computer program PRG is at least temporarily stored in said non-volatile memory 204b. Data DAT, which may e.g. be used for executing the method according to the embodiments, may at least temporarily be stored in said RAM 204a. Said data DAT may e.g. comprise said first data Dat_1 (FIG. 2A), i.e. sensor data or data derived from said sensor data, e.g. characterizing and/or representing observations $Y_S$ and/or $Y_D$ and/or $Y_T$ as explained above.

According to further preferred embodiments, an optional computer-readable storage medium SM comprising instructions, e.g. in the form of a further computer program PRG', may be provided, wherein said further computer program PRG', when executed by a computer, i.e. by the calculating unit 202, may cause the computer 202 to carry out the method according to the embodiments. As an example, said storage medium SM may comprise or represent a digital storage medium such as a semiconductor memory device (e.g., solid state drive, SSD) and/or a magnetic storage medium such as a disk or harddisk drive (HDD) and/or an optical storage medium such as a compact disc (CD) or DVD (digital versatile disc) or the like.

According to further preferred embodiments, the apparatus 200 may comprise an optional data interface 206, preferably for bidirectional data exchange with an external device (not shown). As an example, by means of said data interface 206, a data carrier signal DCS may be received, e.g. from said external device, for example via a wired or a wireless data transmission medium, e.g. over a (virtual) private computer network and/or a public computer network such as e.g. the Internet. According to further preferred embodiments, the data carrier signal DCS may represent or carry the computer program PRG according to the embodiments, or at least a part thereof.

According to further preferred embodiments, the apparatus 200 may also be used to provide a machine learning system MLS, e.g. performing one or more LfD techniques, preferably incorporating a method according to preferred embodiments, cf. e.g. FIG. 2A to 2C.

Figure 5A:
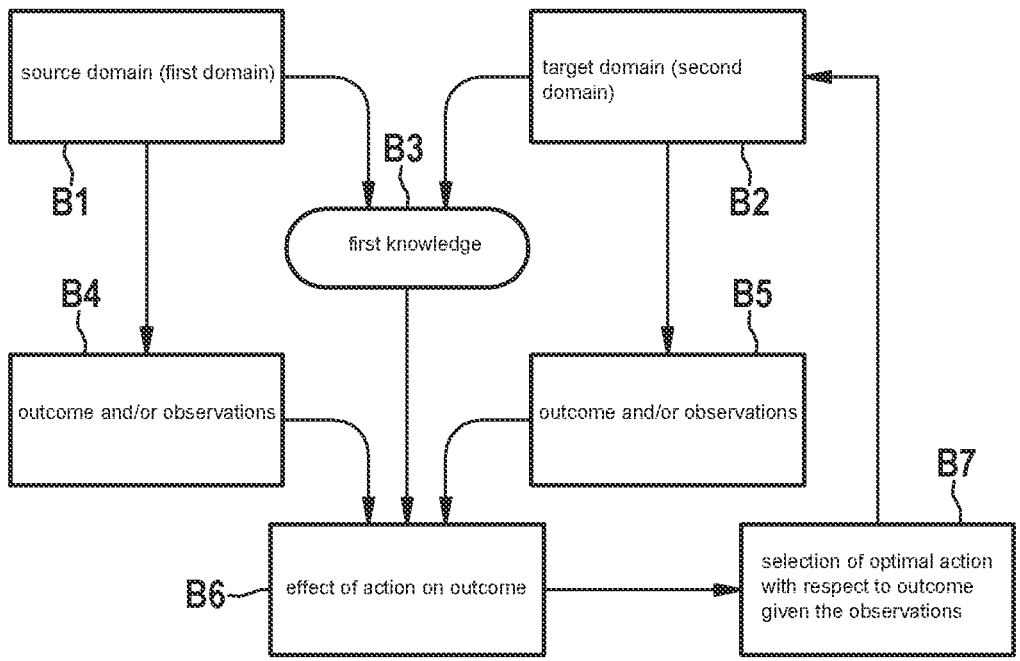
FIG. 5A schematically depicts a simplified block diagram according to further preferred embodiments of the present invention.

FIG. 5A schematically depicts a simplified block diagram according to further preferred embodiments, wherein said block diagram of FIG. 5A may e.g. be associated with a first task exemplarily characterized by at least one of the steps 140 (FIG. 2C), 164 (FIG. 7A) explained above according to further preferred embodiments. Block B1 of FIG. 5A characterizes a source domain, i.e. the first domain D_1 (FIG. 1), block B2 characterizes a target domain, i.e. the second domain D_2 (FIG. 1), block B3 characterizes knowledge, e.g. said first knowledge KN_1 (FIG. 2A) or at least a part KN_1' thereof, block B4 characterizes an outcome Z and/or observations $Y_S$, block B5 characterizes an outcome Z and/or observations $Y_T$, block B6 characterizes an effect of action A on the outcome Z given the observations $Y_T$, i.e. according to p(Z|do(A), $Y_T$), and block B7 characterizes a selection of an optimal action A with respect to the outcome Z given the observations $Y_T$.

Figure 5B:
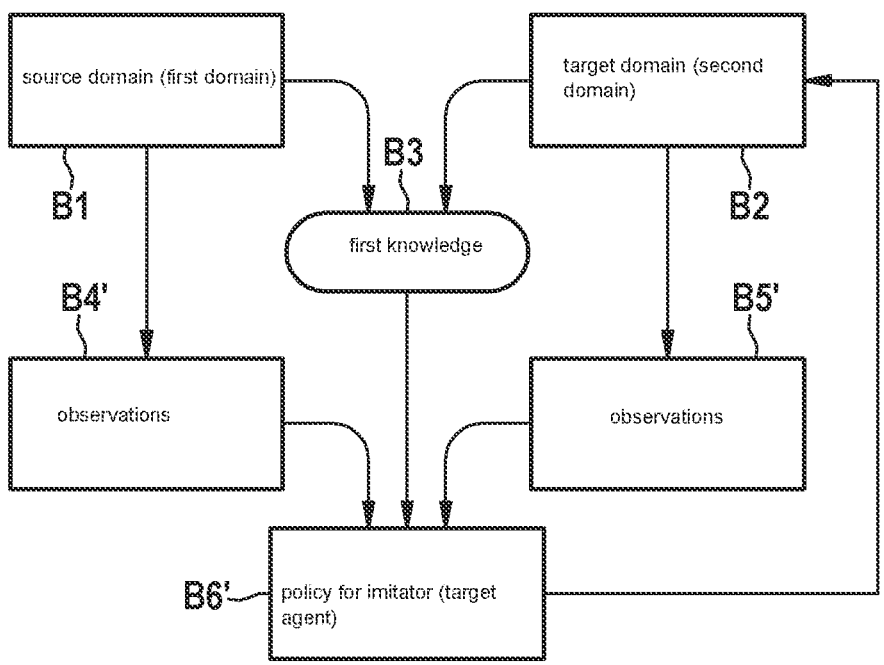
FIG. 5B schematically depicts a simplified block diagram according to further preferred embodiments of the present invention.

FIG. 5B schematically depicts a simplified block diagram according to further preferred embodiments, wherein said block diagram of FIG. 5B may e.g. be associated with a second task exemplarily characterized by at least one of the steps 164 (FIG. 7A), 164a, 164b, 164c (FIG. 7B) explained above according to further preferred embodiments.

Similar to FIG. 5A, block B1 of FIG. 5B characterizes the source domain, i.e. the first domain D_1 (FIG. 1), block B2 characterizes the target domain, i.e. the second domain D_2 (FIG. 1), and block B3 characterizes knowledge, e.g. said first knowledge KN_1 (FIG. 2A) or at least a part KN_1' thereof. Block B4' of FIG. 5B characterizes observations $Y_S$, block B5 characterizes observations $Y_T$, and block B6' characterizes a policy for an imitator, i.e. the target agent 20 (FIG. 1), wherein said policy may e.g. be characterized by $\Pi(A \mid Y_T)$.

Figure 8:
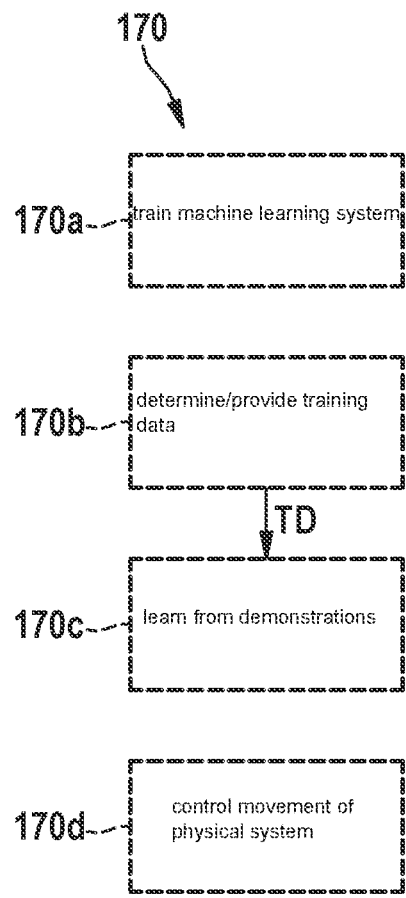
FIG. 8 schematically depicts a simplified flow chart of a method according to further preferred embodiments of the present invention.

Further preferred embodiments relate to a use 170, cf. FIG. 8, of the method according to the embodiments and/or of the apparatus 200 (FIG. 4) according to the embodiments and/or of the computer program PRG, PRG' according to the embodiments for at least one of: a) training 170*a* (FIG. 8) a machine learning system MLS (FIG. 2), b) determining 170*b* and/or providing training data TD, particularly for a machine learning system MLS, c) learning 170*c* from demonstrations, particularly under sensor-shift, i.e., when the sensors of the demonstrator 10, the sensors that are used to observe the demonstrator 10, and the sensors of the AI agent that is to be trained are different, d) controlling 170*d* movement of a physical system such as a robot or an autonomous car.

According to further preferred embodiments, the principle according to the embodiments can be used to receive sensor signals (e.g., as said first data Dat_1, cf. FIG. 2A), e.g. from at least one sensor such as, e.g., video, radar, LiDAR, ultrasonic, motion, and the like, to name a few, wherein, e.g., at least parts of said sensor signals may be processed as said data associated with the first domain D_1 according to preferred embodiments.

According to further preferred embodiments, the principle according to the embodiments can be used to compute one or more control signals for controlling a physical system, like e.g. a computer-controlled machine, like a robot, a vehicle, a manufacturing machine, a personal assistant or an access control system or the like. Advantageously, LfD-techniques may be used according to further preferred embodiments, even if there is a non-vanishing sensor-shift.

Further preferred embodiments may comprise at least one of the following steps: a) analyzing and/or processing the sensor data, b) incorporating specifications of sensors in both the source domain (first domain) D_1 and the target (second) domain(s) D_2, c) transfer extracted knowledge from the source domain D_1 to the target domain D_2.

According to further preferred embodiments, the principle according to the embodiments can be used to train a machine learning system MLS (FIG. 4) that can be used for e.g. the above applications.

According to further preferred embodiments, the principle according to the embodiments can be used to generate training data TD (cf. step 170*b* of FIG. 8) for training a machine learning system MLS that can e.g. be used for the above applications.

In the following paragraphs, further preferred embodiments and exemplary aspects are exemplarily disclosed with reference to an algorithm as presented in table 1 below. Table 1 has two columns, wherein a first column identifies a line number, and wherein a second column comprises pseudocode representing elements of said algorithm. The algorithm of table 1 may, according to further preferred embodiments, e.g. be used to parameterize a solution set of the matrix equation [equation 1] mentioned above, e.g. with respect to step 160 of FIG. 7A.

According to further preferred embodiments, inputs to the algorithm of table 1 are: P(z, a, $Y_S$), i.e. the left hand side of [equation 1] and $[P(y^i|x^j)]_{i=1,j=1}^{m,l}$, i.e. the matrix of [equation 1].

According to further preferred embodiments, the output of the algorithm of table 1 is:
$\zeta_1, \ldots, \zeta_k \in \mathbb{R}^l$, such that their convex hull is the solution set to (3)

* Start of Table 1: algorithm 1 *

1  Rearrange columns of $[P(y^i|x^j)]_{i,j=1}^{m,l}$ such that
   $[P(y^i|x^j)]_{i,j=1}^{m,l} = [D\ E]$ amd $D \in$ is non-singular:
2  $U\Sigma V^T \leftarrow$ SVD of $[P(y^i|x^j)]_{i,j=1}^{m,l}$;
3  for i = 1 to l − m do
4  $\quad e_i \leftarrow$ zero vector of length l − m whose ith entry is one:

5  $M \leftarrow V \begin{bmatrix} 0 & \cdots & 0 \\ e_1 & \cdots & e_{l-m} \end{bmatrix}, b \leftarrow \begin{bmatrix} D^{-1}P(z, a, Y_S) \\ 0 \end{bmatrix}$;

6  i ← 1;
7  for any sub-matrix R of M with dimension
   (l − m) × (l − m) do
8  $\quad \hat{b} \leftarrow$ the sub-vector of b of length l − m that
   corresponds to the selected rows of M;
9  $\quad$ if $R^{-1}$ exists and $-M R^{-1} \hat{b} + b \geq 0$ then
10 $\quad\quad \zeta_i \leftarrow -M R^{-1}\hat{b} + b$;
11 $\quad\quad$ i ← i + 1;

* End of Table 1: algorithm 1 *

According to further preferred, exemplary and particularly non-limiting, embodiments, in the following, each line of algorithm 1 is explained in further detail.

Line 1: rearrange the columns of matrix $[P(y^i|x^j)]_{i=1,j=1}^{m,l}$ to obtain a matrix which, for simplicity, we denote again by $[P(y^i|x^j)]_{i=1,j=1}^{m,l}$, such that the first m columns of it (denoted by D) becomes a non-singular matrix (the remaining columns are denoted by E).

Line 2: After rearrangement, singular value decomposition (SVD) is been applied to obtain matrices U, V, and Σ. SVD is a factorization method that finds a factorization of a given matrix say $[P(y^i|x^j)]_{i=1,j=1}^{m,l}$ based on its singular values.

Lines 3 and 4: construct a set of l-m unity vectors $e_i$ in which all entries are zero except one entry.

Line 5: construct matrix M and vector b using the previously constructed vectors and matrices.

Line 6: start a counter by setting in to 1.

Line 7 to 11: using a for-loop obtain the outputs. In this loop the following occurs Line 8: construct a sub-vector $\hat{b}$ of b with length l-m that are selected according to the selection of sub-matrix R.

Line 9: check if the selected sub-matrix R is non-singular (has inverse) and further if $-MR^{-1}\hat{b}+b$ is a positive vector.

Line 10 and 11: if the conditions are satisfied the output vector $\zeta_i$ will be constructed and the counter will be increased by one.

What is claimed is:

1. A computer-implemented method for performing Learning from Demonstrations based on data associated with a source domain, the method comprising:
   performing, by a demonstrator, physical actions;
   recording, during the performing of the physical actions by the demonstrator, the physical actions of the demonstrator, using sensors of the demonstrator and/or sensors of at least one spectator;
   determining first data characterizing the demonstrator of the source domain, wherein the first data characterizes sensor data of the demonstrator and/or sensor data of the at least one spectator observing the demonstrator;
   determining first knowledge from the source domain based on the first data;
   transferring at least a part of the first knowledge to a second domain;

determining a conditional probability distribution over actions given an observation in the second domain, such that a target agent associated with the second domain behaves similar to the demonstrator of the source domain;

modeling the source domain using a first directed acyclic graph (DAG), and/or modeling the second domain using a second DAG; and performing: a) characterizing one or more aspects of at least one of the first DAG and the second DAG with the equation:

$$P_S(z, a, y_S) =$$
$$\oint_x P_S(y_S \mid x) P_S(z, a, x) = \oint_{x, y_D} P_S(y_S \mid x) p(z \mid a, x) \pi_D(a \mid y_D) P_S(y_D, x),$$

wherein $P_S(z, a, y_S)$ characterizes a joint probability distribution in the source domain of an outcome z related to an action a and the spectator's observation in the source domain $y_S$, where s represents the source domain, wherein $\oint$ characterizes a sum operator, in a case of discrete domains, or an integral operator, in a case of continuous domains, wherein $P_S(y_S \mid x)$ characterizes a conditional probability distribution in the source domain of the spectator's observation in the source domain $y_S$ given a state x, and $P_S(z, a, x)$ characterizes a joint probability distribution in the source domain of the outcome z related to the action a and the state x, wherein $P(z \mid a, x)$ characterizes a conditional probability distribution of the outcome z given the action a and the state x, wherein $\pi_D(a \mid Y_D)$ characterizes a policy of the demonstrator, wherein the policy of the demonstrator is a conditional distribution of the action a given an input of the demonstrator $Y_D$, where D represents the demonstrator, and wherein $P_S(Y_D, x)$ characterizes a joint probability distribution in the source domain of the input of the demonstrator $Y_D$ and the state x.

2. The method according to claim 1, wherein the Learning from Demonstrations is Imitation Learning.

3. The method according to claim 1, further comprising:
determining an effect of an action to an outcome in the second domain conditional on an observation in the second domain.

4. The method according to claim 3, further comprising:
providing a utility function associated with the outcome.

5. The method according to claim 1, further comprising:
determining a conditional probability distribution over actions given the observation in the second domain, such that the target agent associated with the second domain behaves similar to the demonstrator of the source domain.

6. The method as recited in claim 1, wherein the method is used for a) training a machine learning system, and/or b) determining and/or providing training data for a machine learning system, and/or c) learning from demonstrations under sensor-shift, d) controlling movement of a physical system, and/or e) providing a control signal for controlling a vehicle.

7. The method according to claim 1, further comprising:
using at least one of the following equations for the step of determining the conditional probability distribution over actions a:

$$\hat{\pi}_T^{(1)}(a \mid Y_T = y) = \oint_{y'} ps(a \mid Y_S = y') ps(Y_S = y' \mid Y_D = y); \quad a)$$

$$\hat{\pi}_T^{(2)}(a \mid Y_T) \propto \exp\left(\oint_{y_S} p(Y_S \mid Y_T) \log p_S(a \mid Y_S)\right); \quad b)$$

$$\hat{\pi}_T^{(3)}(a \mid Y_T) \propto \exp\left(\oint_x p(x \mid Y_T) \log \tilde{p}(a \mid x)\right), \text{ wherein} \quad c)$$

$$\tilde{p}(a \mid x) := \oint_y pS(a \mid Y_S = y) pS(Y_S = y \mid x);$$

wherein $$\hat{\pi}_T(a \mid Y_T)$$

characterizes a policy of the target agent, wherein the policy of the target agent is a conditional probability distribution of action a given an observation of the target agent in a target domain $Y_T$, wherein T represents the target domain;

wherein equation a) is used when the observation in the second domain is the same as the observation of the demonstrator $Y_D$;

wherein equation b) is used when sensors of the demonstrator and sensors of the target agent in the source domain are the same, but when sensors of the target agent in the source domain are different from sensor of the target agent in the second domain;

wherein equation c) is used when sensors of the demonstrator and sensors of the target agent in the source domain and sensors of the target agent in the second domain are each different from each other.

8. The computer-implemented method according to claim 1, further comprising:
training a machine learning system using the at least part of the first knowledge transferred to the second domain.

9. The computer-implemented method according to claim 1, further comprising:
determining one or more control signals for controlling a physical system using the at least part of the first knowledge transferred to the second domain; and
controlling the physical system using the determined one or more control signals.

10. The computer-implemented method according to claim 9, wherein the technical system is a robot or a robot or a manufacturing machine or a personal assistant or an access control system.

11. The computer-implemented method according to claim 1, wherein the sensors of the demonstrator and/or sensors of at least one spectator include at least one of: a video sensor, a radar sensor, a LiDAR sensor, an ultrasonic sensor, a motion sensor.

12. A computer-implemented method for performing Learning from Demonstrations of a system based on data associated with a source domain, the method comprising:
performing, by a demonstrator, physical actions;
recording, during the performing of the physical actions by the demonstrator, the physical actions of the demonstrator, using sensors of the demonstrator and/or sensors of at least one spectator;
determining first data characterizing the demonstrator of the source domain, wherein the first data characterizes sensor data of the demonstrator and/or sensor data of the at least one spectator observing the demonstrator;

determining first knowledge from the source domain based on the first data;

transferring at least a part of the first knowledge to a second domain;

determining an effect of an action to an outcome in the second domain conditional on an observation in the second domain;

using, for the step of determining the effect, the following equation:

$$\tilde{p}(Z \mid X = x, A) := \sum_y ps(Z \mid Y_S = y, A) p(Y_S = y \mid x)$$

wherein $\tilde{p}(Z|X=x, A)$ characterizes an average-based action-effect proxy for a conditional probability distribution of the outcome Z given the action A and a state of the system x of the system, wherein X is a variable characterizing the state of the system, wherein $p_S(Z|Ys=y, A)$ characterizes a conditional probability distribution of the outcome given the action A and the observation in the source domain Ys, wherein y is an instance of the observation, and wherein p(Ys=y|x) characterizes a conditional probability distribution of the observation in the source domain Ys given the state x, and s represents the source domain.

13. The computer-implemented method according to claim 12, further comprising:

training a machine learning system using the at least part of the first knowledge transferred to the second domain.

14. The computer-implemented method according to claim 12, further comprising:

determining one or more control signals for controlling a physical system using the at least part of the first knowledge transferred to the second domain; and controlling the physical system using the determined one or more control signals.

15. The computer-implemented method according to claim 14, wherein the technical system is a robot or a robot or a manufacturing machine or a personal assistant or an access control system.

16. The computer-implemented method according to claim 12, wherein the sensors of the demonstrator and/or sensors of at least one spectator include at least one of: a video sensor, a radar sensor, a LIDAR sensor, an ultrasonic sensor, a motion sensor.

17. A non-transitory computer-readable storage medium on which is stored instructions for performing Learning from Demonstrations based on data associated with a source domain, the instructions, when executed by a computer, causing the computer to perform the following steps:

performing, by a demonstrator, physical actions;

recording, during the performing of the physical actions by the demonstrator, the physical actions of the demonstrator, using sensors of the demonstrator and/or sensors of at least one spectator;

determining first data characterizing a demonstrator of the source domain, wherein the first data characterizes sensor data of the demonstrator and/or sensor data of the at least one spectator observing the demonstrator;

determining first knowledge from the source domain based on the first data;

transferring at least a part of the first knowledge to a second domain;

determining an effect of an action to an outcome in the second domain conditional on an observation in the second domain;

using, for the step of determining the effect, the following equation:

$$\tilde{p}(Z \mid X = x, A) := \sum_y ps(Z \mid Y_S = y, A) p(Y_S = y \mid x)$$

wherein $\tilde{p}(Z \mid X = x, A)$ characterizes an average-based action-effect proxy for a conditional probability distribution of an outcome given action A and state x, wherein $p_S(Z|Ys=y, A)$ characterizes a conditional probability distribution of the outcome given the action A and the observation y in the source domain Ys, and wherein p(Ys=y|x) characterizes a conditional probability distribution of the observation y in the source domain Ys given the state x, and s represents the source domain.

* * * * *